(12) United States Patent
Miyamoto et al.

(10) Patent No.: US 6,901,908 B2
(45) Date of Patent: Jun. 7, 2005

(54) IDLE SPEED CONTROL APPARATUS AND METHOD FOR INTERNAL COMBUSTION ENGINE

(75) Inventors: Katsuhiko Miyamoto, Kyoto (JP); Hideo Nakai, Siga (JP); Katsuyuki Maeda, Siga (JP); Seiji Shiota, Kyoto (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 110 days.

(21) Appl. No.: 10/405,602

(22) Filed: Apr. 3, 2003

(65) Prior Publication Data

US 2003/0221665 A1 Dec. 4, 2003

(30) Foreign Application Priority Data

Apr. 3, 2002 (JP) ....................... 2002-101470

(51) Int. Cl.[7] ............................ F02D 41/00; F02M 3/00
(52) U.S. Cl. ........................ 123/339.11; 123/406.52; 123/406.53
(58) Field of Search .................. 123/339.11, 406.52, 123/406.53, 406.54; 701/105, 113

(56) References Cited

U.S. PATENT DOCUMENTS 6,276,131 B1 * 8/2001 Ueno et al. ................. 60/285
6,367,446 B1 * 4/2002 Kanamaru et al. ...... 123/339.12
6,505,594 B1 * 1/2003 Katayama et al. ...... 123/179.18
6,732,504 B2 * 5/2004 Majima et al. ................ 60/284
2004/0221834 A1 * 11/2004 Miyamoto et al. .......... 123/399

FOREIGN PATENT DOCUMENTS

JP          10-299631 A         11/1998

* cited by examiner

*Primary Examiner*—Hai Huynh
(74) *Attorney, Agent, or Firm*—Birch, Stewart, Kolasch & Birch, LLP

(57) ABSTRACT

An idle speed control apparatus for an internal combustion engine is provided which, when the internal combustion engine is started in a cold mode, provides ignition timing engine speed control (m1) such that ignition timing in which said ignition driving device performs ignition in the internal combustion engine is retarded and the engine speed of the internal combustion engine is controlled to the target engine speed, and then provides intake air quantity engine speed control (m2) such that the engine speed of the internal combustion engine is feedback-controlled to the target engine speed by controlling the intake air quantity of the internal combustion engine. As a result, it is possible to prevent the exhaust gas temperature from being increased insufficiently due to a deficiency in retard angle, and to prevent the activation of a catalytic converter from being delayed.

18 Claims, 11 Drawing Sheets

IDLE SPEED CONTROL APPARATUS AND METHOD FOR INTERNAL COMBUSTION ENGINE

CROSS-REFERENCE TO RELATED APPLICATIONS

This application incorporates by reference the subject matter of Application No. 2002-101470 filed in Japan on Apr. 3, 2002, on which a priority claim is based on under 35 U.S.C. §119(a).

BACKGROUND OF THE INVENTION (1) Field of the Invention

The present invention relates to an idle speed control apparatus that controls an idle speed of an internal combustion engine according to an operating state of the engine. In particular, the present invention relates to an idle speed control apparatus that controls an idle speed of an internal combustion engine according to an ignition timing controlled for promoting the warm-up.

(2) Description of the Related Art

An internal combustion engine is required to stabilize its idling operation when it is cold started. The internal combustion engine is also required to promote the warm-up so as to promptly activate a catalyst and ensure desired exhaust gas purifying performance.

Therefore, to stabilize the idling operation of the internal combustion engine in a cold mode, the target idle speed is set to a higher speed than normal. Then, the ignition timing of the internal combustion engine is corrected to be later than the normal ignition timing to thereby increase the exhaust temperature. At the same time, the intake air quantity of the internal combustion engine is increased to suppress the reduction of torque produced by the internal combustion engine with the retard of the ignition timing.

For example, a conventional idle speed control apparatus for an internal combustion engine shown in FIG. 14 is constructed such that, during a warm-up, the angle θs of an electronically controlled throttle valve (ETV) is switched at a time point t1 to a warm-up target initial angle θ1. The initial angle θs1 is corrected with age. The intake air quantity Qa and the engine speed Ne are increased and decreased according to variations in the throttle valve θs. At the initial stage of starting, the engine speed Ne overshoots a target idle speed Ne1. Then, the engine speed Ne starts coming closer to the target idle speed Ne1 corresponding to the intake air quantity Qa and the ignition timing IGT.

In this case, in response to a command indicative of the ETV angle θs, the ETV is open-loop controlled to maintain the angle θs as shown in FIG. 14. In response to a command indicative of the ignition timing IGT, an igniting device is feedback-controlled to maintain the ignition timing IGT as shown in FIG. 14. This causes the engine speed Ne to come closer to the target idle speed Ne1, and a variation in the engine speed Ne is corrected.

It should be noted that the internal combustion engine is switched from the warm-up state to steady state at a warm-up completion time point t2. On this occasion, the ETV angle θs is switched to a steady state angle θsn, and the ignition timing IGT is also switched step by step to steady state ignition timing IGT n, so that the engine speed Ne is switched with age to a steady state target idle speed Nen.

According to a prior art disclosed in Japanese Laid-Open Patent Publication (Kokai) No. 10-299631, when an internal combustion engine is idling, the ignition timing is retarded to increase the exhaust gas temperature so as to promptly secure desired purifying performance of a catalytic device. According to this prior art, the reduction of torque produced by the internal combustion engine and the variation of the engine speed accompanied by the retard of the ignition timing are suppressed by increasing the intake air quantity while retarding the ignition timing.

Incidentally, in the case of an electronically controlled throttle valve used in an idle speed control apparatus for an internal combustion engine, the intake air quantity Qa is likely to deviate due to aging changes of the throttle valve or variations among products.

However, the conventional idle speed control apparatus for the internal combustion engine shown in FIG. 14 and the idle speed control apparatus for the internal combustion engine disclosed in Japanese Laid-Open Patent Publication (Kokai) No. 10-299631 open-loop control the intake air quantity.

For this reason, particularly in the case where the intake air quantity Qa is deviated by Δq to smaller values (refer to a broken line in FIG. 14), the target ignition timing IGT is displaced by a deviation ΔIGT toward earlier timing (refer to a broken line) even if the target idle speed Ne is feedback-controlled by correcting the target ignition timing IGT. In this case, the advancement of the target ignition timing IGT has a deficiency equivalent to the deviation ΔIGT, and this leads to insufficient increase of the exhaust gas temperature. As a result, the activation of a catalyst is delayed to increase the total amount of exhaust gases emitted from a vehicle. This problem is desired to be solved.

It is therefore an object of the present invention to provide an idle speed control apparatus for an internal combustion engine, which feedback-controls the intake air quantity and the ignition timing to respective target values during warm-up, thus preventing the exhaust gas temperature from being increased insufficiently due to a deficiency in retard angle, and to prevent the activation of a catalytic converter from being delayed, even if there is a deviation in the angle of the throttle valve due to aging changes of the throttle valve or variations among products.

SUMMARY OF THE INVENTION

To attain the above object, an idle speed control apparatus for an internal combustion engine is provided which, when the internal combustion engine is started in a cold mode, provides ignition timing engine speed control such that ignition timing in which said ignition driving device performs ignition in the internal combustion engine is retarded and the engine speed of the internal combustion engine is controlled to a target engine speed, and then provides intake air quantity engine speed control such that the engine speed of the internal combustion engine is feedback-controlled to the target engine speed by controlling operation of the intake air quantity control device.

With the above arrangement, when the engine is started in the cold mode, the ignition timing is retarded and the engine speed of the engine is feedback-controlled to the target engine speed. As a result, it is possible to promptly increase the exhaust gas temperature and increase the temperature of the catalytic device, and to control the engine speed to the target engine speed with a high responsiveness and to inhibit a surge in the engine speed, thus suppressing the emission of unburned fuel at the time of cold-start. Thereafter, the intake air quantity is controlled to feed-back control the engine speed to the target engine speed, so that the idle speed can be stabilized while the catalyst temperature is increased in an efficient manner by retarding the ignition timing.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DESCRIPTION OF THE PREFERRED EMBODIMENT

Figure 1:
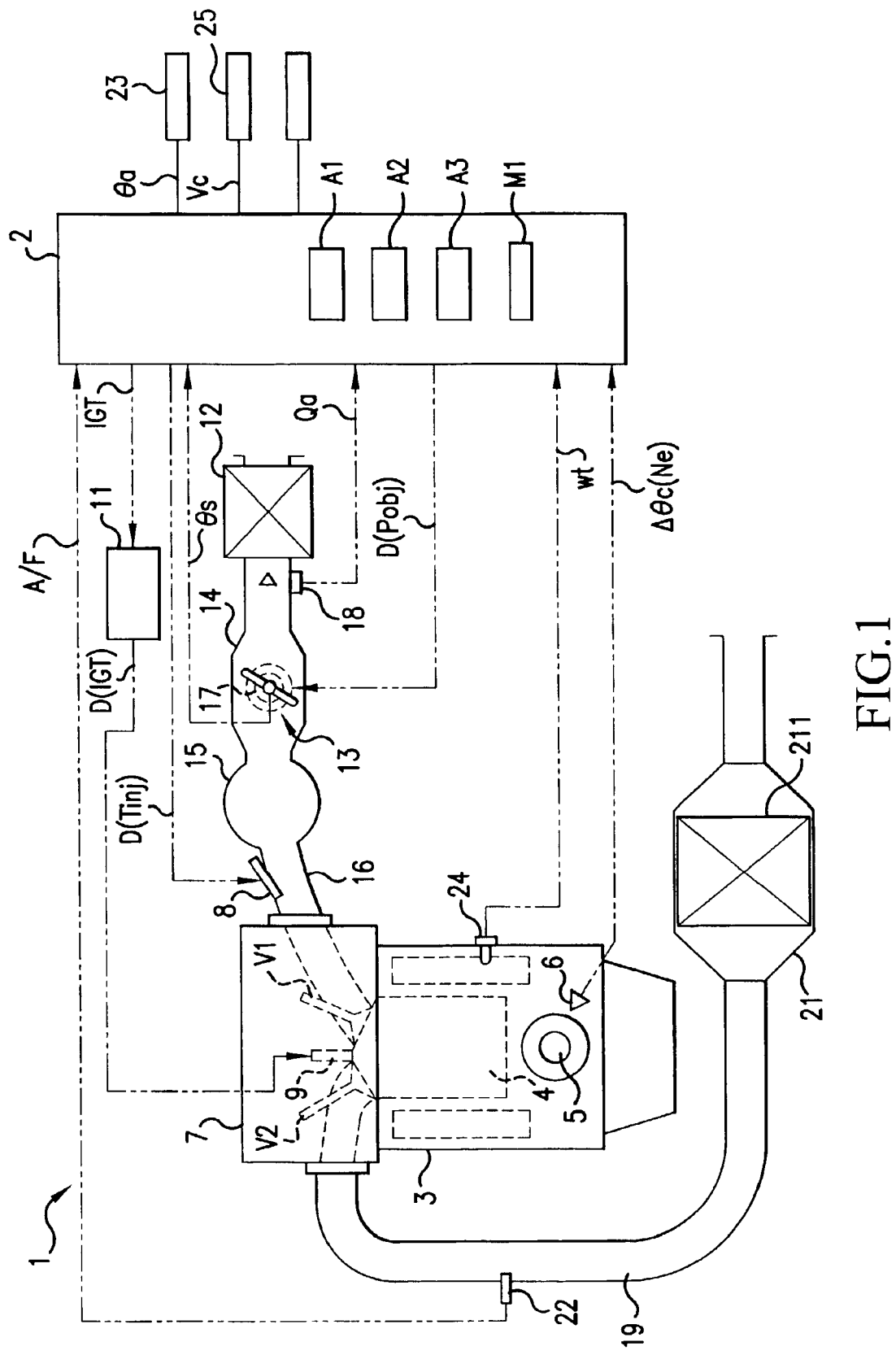
FIG. 1 is a view schematically showing the overall construction of an engine and a control system equipped with an idle speed control apparatus for an internal combustion engine according to the present invention.

The present invention will now be described in further detail with reference to the drawings showing an embodiment thereof. FIG. 1 illustrates an idle speed control apparatus for an internal combustion engine, and an engine 1 as the internal combustion engine equipped with the idle speed control apparatus. The engine 1 in FIG. 1 is used to produce power for driving a vehicle, and a controller 2 controls an intake system, fuel supply system, and ignition system of the engine 1.

The engine 1 is provided with a plurality of combustion chambers 4 (only one is illustrated in FIG. 1) arranged in a cylinder block 3. The action of a piston, not shown, provided in each of the combustion chambers 4 is converted into torque by a crank shaft 5, and is transmitted to a rotation driving system, not shown. A crank angle sensor 6 is opposed to the crank shaft 5, and outputs crank angle information $\Delta\eta c$ to the controller 2. The controller 2 derives the engine speed Ne from the crank angle information $\Delta\theta c$.

An intake valve v1 and an exhaust valve v2, which open and close the combustion chamber 4, as well as an ignition plug 9 are attached to a cylinder head 7 of each cylinder of the engine 1, and a fuel injection valve 8 is attached to an intake port of each cylinder. Fuel is supplied to the fuel injection valve 8 from the fuel supply system. The fuel injection valve 8 is actuated to inject fuel in response to a fuel injection output D (Tinj) with a pulse width corresponding to the fuel injection quantity Tinj, which is derived from the operating state by a fuel quantity control section A1 provided in the controller 2. The ignition plug 9 of the ignition system is connected to an ignition circuit 11. In response to a signal indicative of ignition timing IGT from an ignition control section A2 provided in the controller 2, the ignition circuit 11 issues an ignition output $D_{IGT}$ to the ignition plug 9 in the ignition timing IGT.

The intake system is capable of drawing the intake air from an air cleaner 12 to a surge tank 15 via an intake pipe 14 equipped with an electronically controlled throttle valve (hereinafter refereed to as "ETV") 13, and drawing the intake air from the surge tank 15 to the combustion chamber 4 via an intake manifold 16 when the intake valve v1 is opened. The ETV 13 is configured to switch its valve angles in response to a valve open output Pobj from a throttle valve driving section A3 provided in the controller 2.

A throttle angle sensor 17 is attached to a rotary shaft of the ETV 13, and a signal indicative of the throttle angle $\theta s$ transmitted from the throttle angle sensor 17 is inputted to the controller 2. Further, an air flow sensor 18 for detecting the intake air quantity Qa is attached to the intake pipe 14, and a signal indicative of the intake air quantity Qa transmitted by the air flow sensor 18 is inputted to the controller 2. The exhaust system is constructed such that a catalytic converter 21 is disposed in an exhaust pipe 19, and an air-fuel ratio sensor 22 is disposed upstream of the catalytic converter 21. A signal indicative of the air-fuel ratio A/F transmitted from the air-fuel ratio sensor 22 is inputted to the controller 2. The catalytic converter 21 has a three-way catalyst incorporated therein via a catalyst carrier 211. The three-way catalyst converts HC, CO, and $NO_x$ in exhaust gases into harmless substances, which are then emitted into the atmosphere.

Referring to FIG. 1, the controller 2 receives the crank angle information $\Delta\theta c$ and the engine speed Ne from the crank angle sensor 6, the throttle angle $\theta s$ from the throttle angel sensor 17, the intake air quantity Qa from the air flow sensor 18, the air-fuel ratio A/F from the air-fuel ratio sensor 22, an accelerator pedal stroke $\theta a$ from an accelerator pedal angle sensor 23, water temperature wt of the cooling water from a water temperature sensor 24, and vehicle speed Vc from a vehicle speed sensor 25.

Further, in a steady state, the throttle valve driving section A3 of the controller 2 calculates a normal valve angle Pobjn according to the accelerator pedal angle $\theta a$, vehicle speed Vc, pedal acceleration/deceleration $\Delta Pa$, and so forth, or calculates a warm-up valve angle Pobju according to the water temperature wt of the cooling water, and then outputs an output signal D (Pobj) indicative of the calculated normal valve angle Pobjn or the warm-up valve angle Pobju to the ETV 13 to control the intake air quantity.

In the steady state, the fuel quantity control section A1 of the controller 2 calculates a basic fuel injection quantity Tb according to the engine speed Ne and the accel pedal angle θa, and adds correction values Twt, Tacc for the water temperature wt, the acceleration/deceleration Vacc to the calculated fuel injection quantity Th to determine the fuel injection quantity Tinj (=Tb+Twt+Tacc). Then, the fuel quantity control section A1 outputs an output signal D (Tinj) indicative of the calculated fuel injection quantity Tinj to the fuel injection valve 8 to control the fuel injection quantity.

In the steady state, the ignition control section A2 of the controller 2 calculates the ignition timing IGT from basic ignition timing IGTb according to the accelerator pedal angle θa or the like and a retard correction value ΔIGT according to the operating state. The ignition control section A2 then outputs an output signal D (IGT) indicative of the calculated ignition timing IGT to each ignition plug 9 via the ignition circuit 11 to perform ignition. In this way, in the steady state, the controller 2 provides known basic control of the intake system, fuel supply system, and ignition system, and here, in particular, the controller 2 also functions as an idle speed control means M1 at the start of the engine 1.

When the engine 1 is cold, i.e., when the engine 1 is started at a water temperature wt of less than 82° C., the idle speed control means M1 of the controller 2 provides ignition timing engine speed control m1 such that the ignition timing IGT of the engine 1 is controlled to be retarded to feedback-control the engine speed Ne to the target engine speed Neo. Then, the controller 2 provides intake air quantity engine speed control m2 such that the intake air quantity Qa of the engine 1 is controlled to feedback-control the engine speed Ne to the target engine speed Neo.

The intake air quantity engine speed control m2 is started one second after the ignition timing-engine speed control m1 causes a difference between the target ignition timing (retard target ignition timing) IGTc and the actual ignition timing IGTN to become equal to or less than a predetermined value ΔIGT1 (1° CA) and causes a difference ΔNe between the target engine speed Neo and the actual engine speed Nen to become equal to or less than a predetermined engine speed ΔNe2 (30 rpm).

Further, during the ignition timing engine speed control m1, the idle speed control means M1 retards the ignition timing according to the actual engine speed Nen with respect to the target engine speed Neo, and corrects the warm-up valve angle (intake throttle angle) Pobj to increase according to the degree of advancement of the actual ignition timing IGTn with respect to the cold mode target ignition timing (retard target ignition timing) IGTc.

Further, after the completion of the ignition timing engine speed control m1, the idle speed control means M1 controls the ignition timing IGT to the retard target ignition timing IGTc according to a variation in the engine speed Ne so as to suppress the variation, and then provides the intake air quantity engine speed control m2. Further, during the intake air quantity engine speed control m2, the idle speed control means M1 leans the air-fuel mixture of the engine 1. Further, during the intake air quantity engine speed control m2, the idle speed control means M1 leans the air-fuel mixture such that the revolution angular velocity dNe lies inside the range of ±dNe. Further, during the intake air quantity engine speed control m2, the idle speed control means M1 controls the ignition timing IGT according to a variation in the engine speed Ne so as to suppress the variation.

Figure 2:
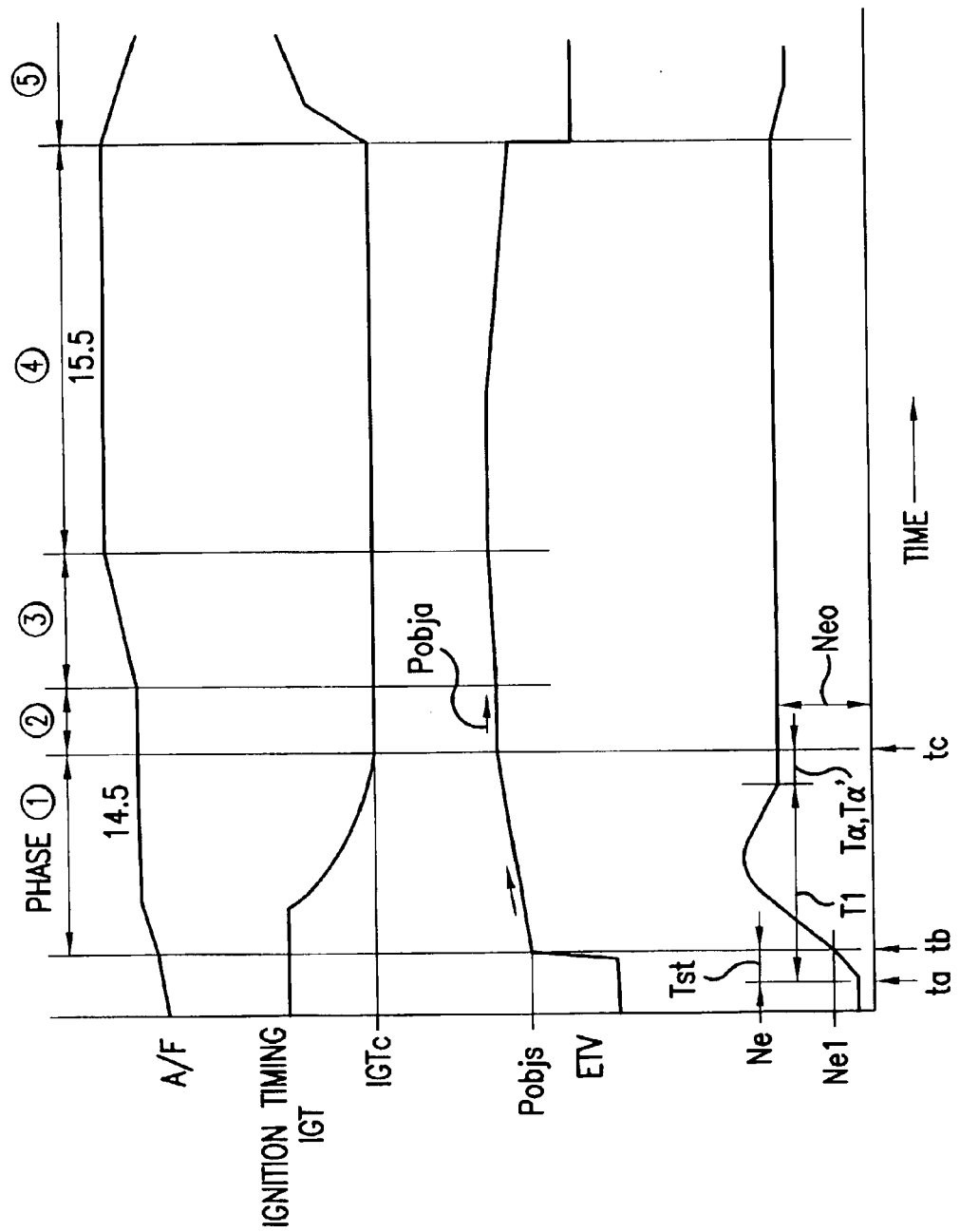
FIG. 2 is a characteristic diagram showing aging changes when the idle speed control apparatus in FIG. 1 is operating.

Next, a description will be given of the operation of the idle sped control apparatus for the internal combustion engine in FIG. 1 with reference to FIG. 2 and FIGS. 7 to 13. FIG. 2 is a characteristic diagram showing aging changes in the operating state of the engine 1, and FIGS. 7 to 13 show control routines for respective control processing performed by the controller 2.

Figure 3:
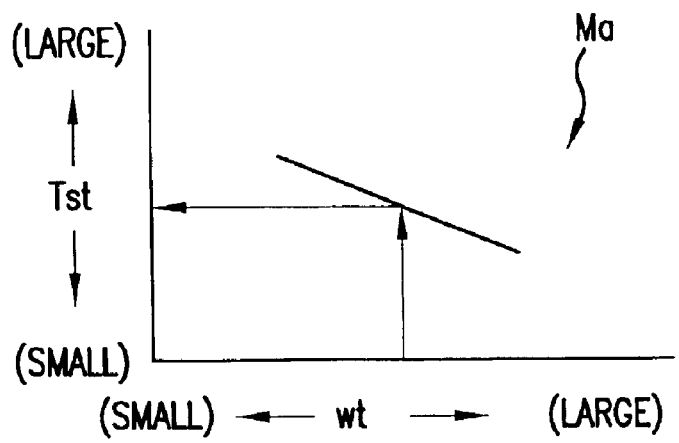
FIG. 3 is a characteristic diagram of a map showing the relationship between the water temperature and the predetermined period after starting, which is used by the idle speed control apparatus in FIG. 1.
Figure 7:
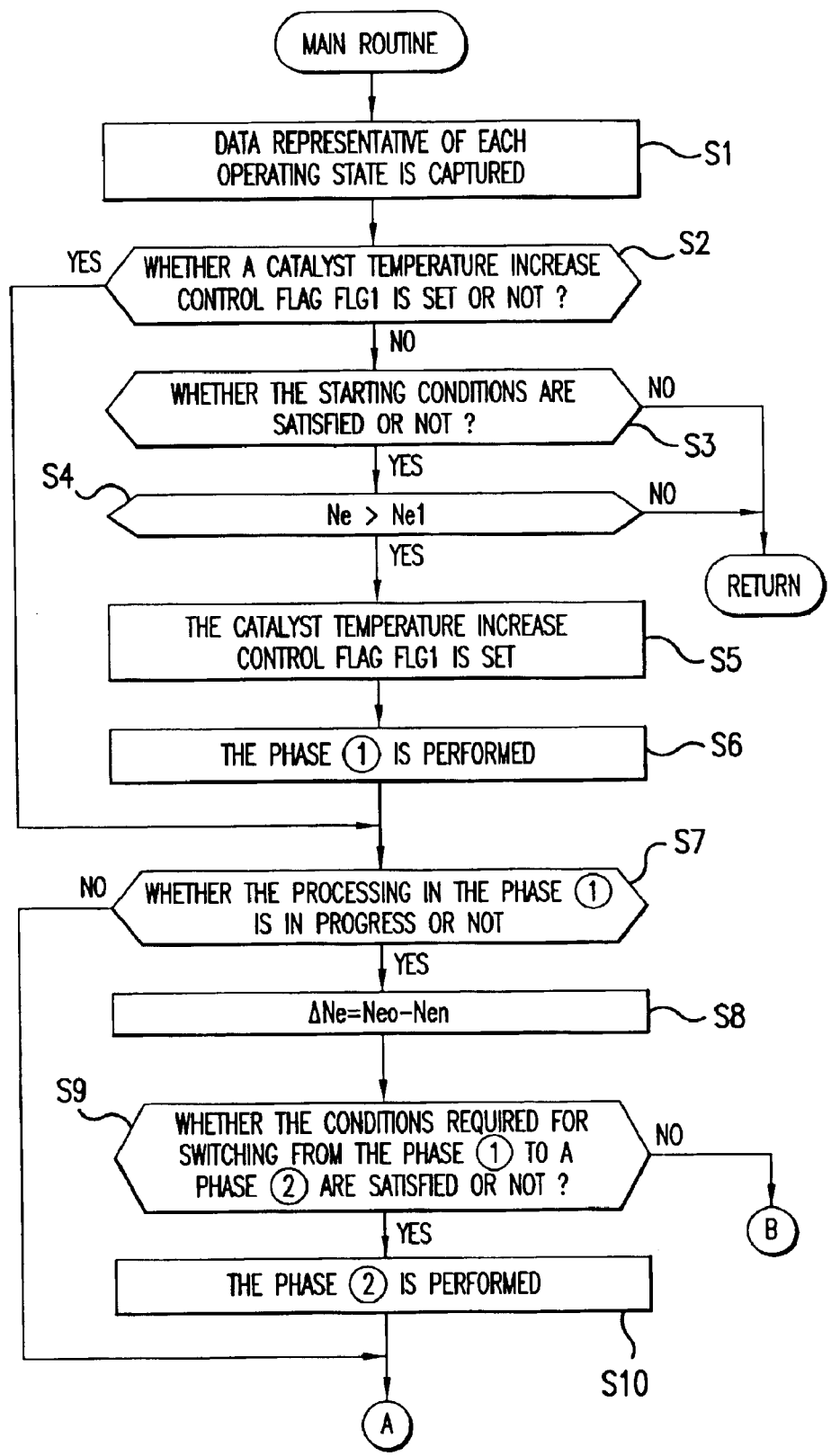
FIG. 7 is a flow chart showing a part of a main routine executed by the idle speed control apparatus in FIG. 1.
Figure 8:
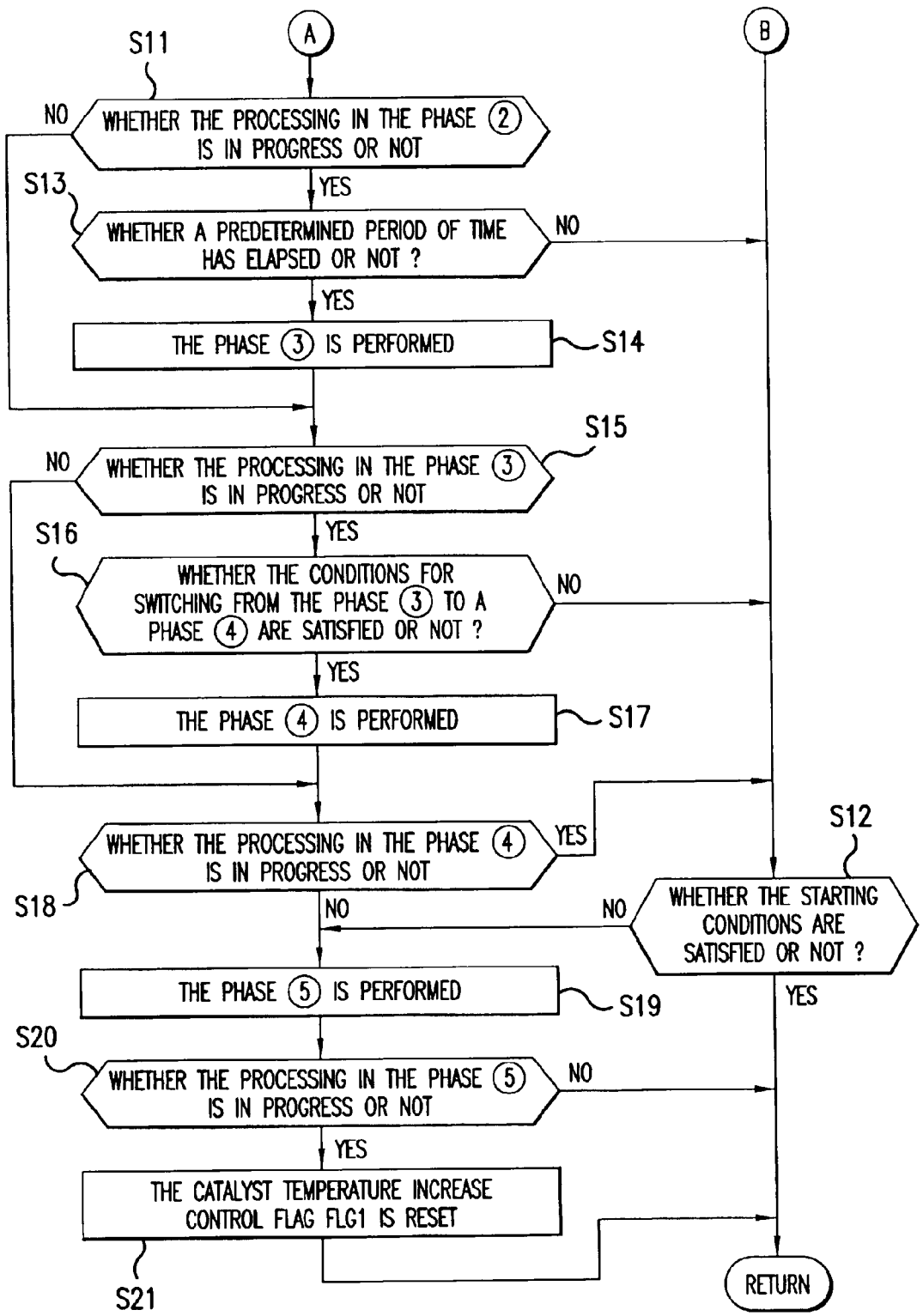
FIG. 8 is a flow chart showing a continued part of the main routine executed by the idle speed control apparatus in FIG. 1.
Figure 9:
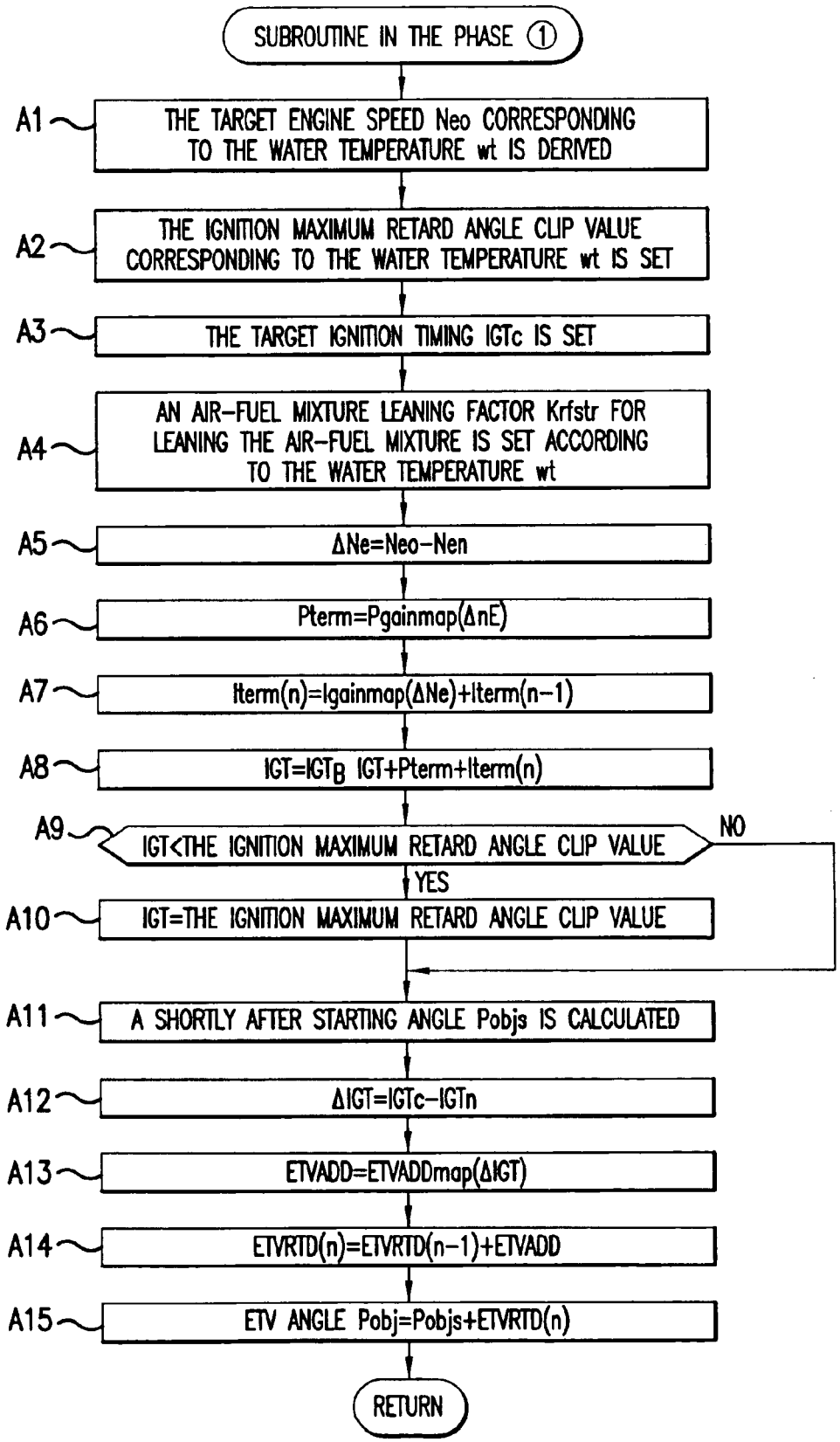
FIG. 9 is a flow chart showing a sub routine in a phase ①, which is executed by the idle speed control apparatus in FIG. 1.

In response to turning-on of a main switch, not shown, the controller 2 repeats a main routine shown in FIGS. 7 and 8 on a predetermined control cycle. When the main switch is turned on at a time point ta and it is determined that the engine 1 has started, data representative of each operating state is captured in Step S1 of a main routine, and whether a catalyst temperature increase control flag FLG1 is set (ON) or not is determined in Step S2. At the start of the control, the flag FLG1 is off, and thus, the process proceeds to Step S3. On the other hand, if it is determined that the flag FLG1 is set, the process then proceeds to Step S7. In Step S3, it is determined whether the starting conditions are satisfied or not. As the engine starting conditions, the water temperature wt is captured first, and the water temperature equivalent after-starting predetermined time Tst is read from an after-starting predetermined time map Ma in FIG. 3 and then stored.

It is then determined whether the water temperature tw lies in the range of the lower limit temperature wt1 (for example, 5° C.) to the upper limit temperature (for example, 50° C.). Further, it is determined whether an idle switch, not shown, opposed to the ETV 13 is ON or not, i.e., whether the engine 1 is idling or not. It is then determined whether the vehicle speed Vc is less than a stop determination value (predetermined value: 2.5 km/h) or not. Further, upon the lapse of the after-starting predetermined time Tst (for example, 2 sec.), it is determined whether the engine speed Ne lies in the range of the lower limit value (for example, 800 rpm) to the upper limit value (for example, 2500 rpm) or not.

If the above described starting conditions are satisfied, the process then proceeds to Step S4, and if not satisfied, i.e., if the warm-up has been completed, of if the engine speed has been excessively increased or the vehicle has started running while the engine 1 is still cold, the present control process is terminated. In the Step S4, whether the engine speed Ne at the initial stage of starting has normally risen or not is determined according to whether or not the engine speed Ne has exceeded a predetermined value Ne1 (for example, 800 rpm) at a stretch. If the engine speed Ne has not exceeded the predetermined value Ne1, the present control process is terminated, and if the engine speed Ne has exceeded the predetermined value Ne1, the process proceeds to Step S. In the Step S5, due to the determination that the starting conditions are satisfied, the catalyst temperature increase control flag FLG1 is set, and the process then proceeds to Step S6 to start phase ①, i.e., control in the cold-start rising range between a time point tb and a time point tc shown in FIG. 2 to provide the ignition timing engine speed control m1 and the intake air quantity engine speed control m2.

Figure 4:
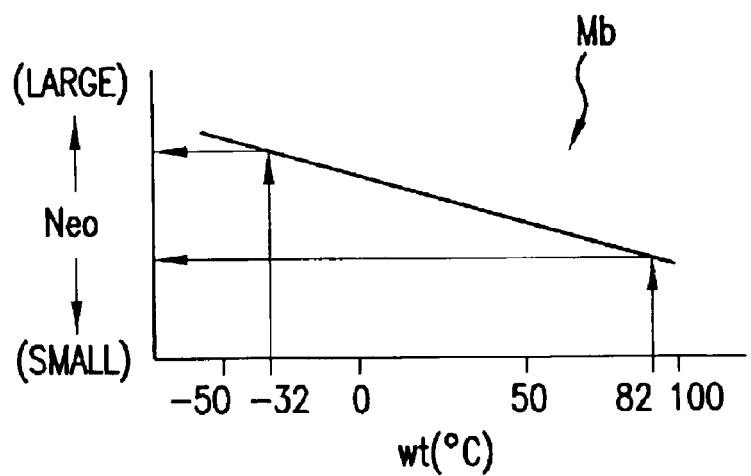
FIG. 4 is a characteristic diagram of a map showing the relationship between the water temperature and the target idle speed, which is used by the idle speed control apparatus in FIG. 1.

In Step A1 of a sub routine for phase ①, the target engine speed (idle speed) Neo corresponding to the water temperature wt is derived from an idle speed map Mb (refer to FIG. 4) set in advance. In the idle speed map Mb, the target engine speed (idle speed) Neo can be set such that it is increased as the water temperature wt is lowered from +82° C. to −32° C., for example. In Step A2, the ignition maximum retard angle clip value (for example, 1° CA) corresponding to the water temperature wt is set, and in Step A3, the target ignition timing IGTc (a set value as shown in FIG. 2) is set.

Figure 5:
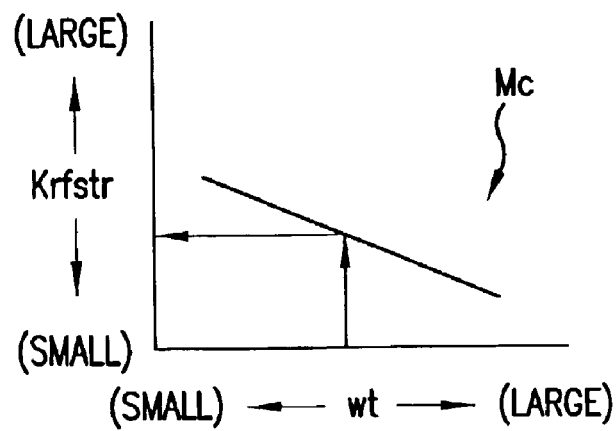
FIG. 5 is a characteristic diagram of a map showing the relationship between the water temperature and the leaning factor, which is used by the idle speed control apparatus in FIG. 1.

In the next Step A4, an air-fuel mixture leaning factor Krfstr for leaning the air-fuel mixture is set according to the water temperature wt with reference to a leaning factor map Mc. In the leaning factor map Mc, as shown in FIG. 5 for example, the leaning factor Krfstr is set such that it becomes smaller as the water temperature wt increases. The normal controlled variable Tinj for increasing quantity immediately after starting, increasing during warm-up, or the like is multiplied by the leaning factor Krfsr to lean the air-fuel mixture. The initial value of the leaning factor Krfsr is set when the engine speed becomes greater than a predetermined engine speed (1300 rpm), and before then, the leaning factor is set to 1.0.

In the next Step A5, the engine speed deviation ΔNe is determined by subtracting the actual engine speed Nen from the target engine speed Neo. On this occasion, if the actual engine speed Nen overshoots the target engine speed Neo, the engine speed deviation ΔNe is negative. In Step A6, a proportion term (P term) for the ignition timing correction value corresponding to the engine speed deviation ΔNe is derived from Pgainmap (ΔNe), not shown, set in advance so that the proportion term (P term) is used for the ignition timing-engine speed control m1. If the engine speed deviation ΔNe is negative, the proportional term (P term) is also negative and is contributed to retard angle.

In the next Step A7, an integration term (I term (n)) for an ignition timing correction value corresponding to the engine speed deviation ΔNe is derived from Igainmap (ΔNe), not shown, set in advance, and the previous value Iterm(n−1) is added to Igainmap(ΔNe). Then, in Step A8, the present ignition timing IGT is calculated by adding together basic ignition timing $IGT_B$, the proportional term (P term), and the integration term (I term (n)). In response to a signal indicative of the present ignition timing IGT, the ignition circuit 11 drives the ignition plug 9 to ignite with an ignition output D(IGT) in the ignition timing IGT, so that the ignition timing is feedback-controlled.

Figure 6:
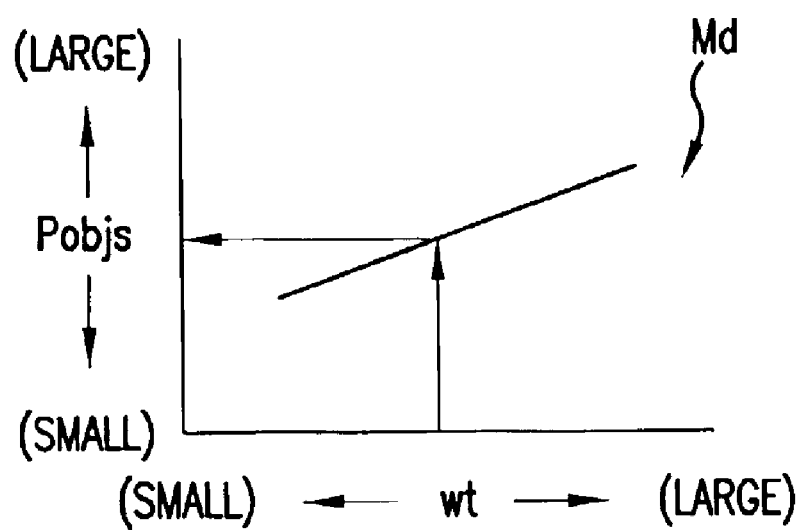
FIG. 6 is a characteristic diagram of a map showing the relationship between the water temperature and the ETV angle, which is used by the idle speed control apparatus in FIG. 1.

In the next Step A9, it is determined whether the present ignition timing IGT is smaller than the ignition maximum retard angle clip value (for example, 1° CA) or not. If the determination result is positive (YES), the process then proceeds to Step A10 wherein the present value is clipped to the ignition maximum retard angle, and if the determination result is negative (NO), the process proceeds then to Step A11. In the Step A11, a shortly after starting angle (intake throttle angle) Pobjs is calculated to be used for the intake air quantity-engine speed control m2 shortly after phase ① is started at the time point tb. Here, the intake throttle angle Pobjs is set as a value corresponding to the water temperature wt with reference to a shortly after starting angle map Md set in advance. In the shortly after staring angle map Md, as shown in FIG. 6, the shortly after angle Pobjs is set such that it is increased as the water temperature wt increases.

In Step A12, the deviation ΔIGT is calculated by subtracting the actual ignition timing IGTn from the retard target ignition timing IGTc corresponding to the water temperature wt found in Step A3, and the process then proceeds to Step A13. In Step A13, a deviation correction additional value ETVADD for the angle of the ETV 13, which is required for eliminating the ignition timing deviation ΔIGT (i.e., making the ignition timing IGT closer to the target ignition timing IGTc) is derived from a deviation correction value map, not shown, set in advance, and the process then proceeds to Step A14.

In Step A14, the present ETV angle increase ETVRTD (n) is calculated by adding the deviation correction additional value ETVADD to the previous value ETVRTD (n−1). Then, in Step A15, the present ETV angle Pobj is determined by adding the present ETV angle increase ETVRTD (n) to the shortly after starting angle (intake throttle angle) Pobjs determined in Step A1, so that the present angle is feedback-controlled to the ETV angle Pobj. The process then returns to the main routine.

In this way, in phase ①, the ignition timing engine speed control m1 provides feedback control such that the ignition timing IGT is corrected to a larger degree as the engine speed deviation ΔNe between the target engine speed Neo and the actual engine speed Nen increases, so that the engine speed deviation ΔNe is eliminated with a high responsiveness to make the engine speed Ne equal to the target engine speed Neo. After the ignition timing engine speed control m1, the intake air quantity engine speed control m2 provides feedback control such that the present ETV angle Pobj is determined and the ETV angle output D (Pobj) is outputted to the ETV 13 to switch the angle thereof to the ETV angle Pobj such that that the ETV angle is increased along an ETV angle Pobj line shown in FIG. 2 so as to compensate for an engine speed decrease caused by the retard angle, so that the difference ΔIGT between the retard target ignition timing IGTc and the actual ignition timing IGTn can be absorbed.

As described above, first at the cold start, the ignition timing IGT is controlled to be retarded to the retard target ignition timing IGTc (Steps A2 and A3) to feedback-control the engine speed Ne to the target engine speed (idle speed) Neo, and therefore, it is possible to promptly increase the exhaust gas temperature to accelerate the temperature increase of the three-way catalyst constituting the catalytic converter 21, thus promptly changing HC, CO, and $NO_x$ in exhaust gases into harmless substances. Further, it is possible to control the engine speed Ne to the target engine speed Neo with a high responsiveness, and suppress the surge of the engine speed Ne, thus reducing the emission of unburned fuel at the cold start. Moreover, after the time point tb, the ETV angle Pobj of the ETV 13 is determined to control the intake air quantity Qa so that the engine speed Ne can be feedback-controlled to the target engine speed Neo, and therefore, it is possible to stabilize the idle speed by suppressing the decrease of the idle speed Neo while increasing the catalyst temperature in an efficient manner by retard angle.

In Step S7 of the main routine, it is determined whether the processing in phase ① is in progress or not. If the determination result is positive (YES), the process then proceeds to Step S8, and if the determination result is negative (NO), the process then proceeds to Step S11 wherein the processing is terminated. In Step S8, the engine speed deviation ΔNe is determined by subtracting the actual engine speed Nen from the target engine speed Neo, and the process then proceeds to Step S9.

In Step S9, it is determined whether the conditions required for switching from phase ① to phase ② (refer to FIG. 2) are satisfied or not. If the determination result is negative (NO), the process then proceeds to Step S12 wherein it is determined whether the above described starting conditions are satisfied or not. If the determination result in Step S9 is positive (YES), the process then proceeds to Step S10.

In Step S9, it is determined whether the conditions required for switching to phase ② (refer to FIG. 2) are satisfied or not. On this occasion, the engine speed deviation ΔNe lies in the range of the engine speed lower limit value ΔNe1 (−100 rpm: when overshooting) to the engine speed upper limit value ΔNe2 (30 rpm). Further, it is determined whether or not Tα (0.1) second has elapsed after a difference between the cold mode target ignition timing (retard target ignition timing) IGTc and the actual ignition timing IGTn becomes equal to or less than the predetermined value ΔIGT1 (1° CA).

Alternatively, it may be determined whether or not T1 second has elapsed after the start, the engine speed deviation ΔNe is less than the engine speed upper limit value ΔNe2 (30 rpm), and a period of time Tα' (arbitrarily set) has elapsed in the state in which a difference between the cold mode target ignition timing (the retard target ignition timing) IGTc and the actual ignition timing IGTn is less than the predetermined value ΔIGT1 (1° CA). As described above, after phase ① is completed by making the ignition timing and the engine peed close to the respective target values, and the conditions required for switching to phase ② are satisfied, the process proceeds to the Step S10.

Figure 10:
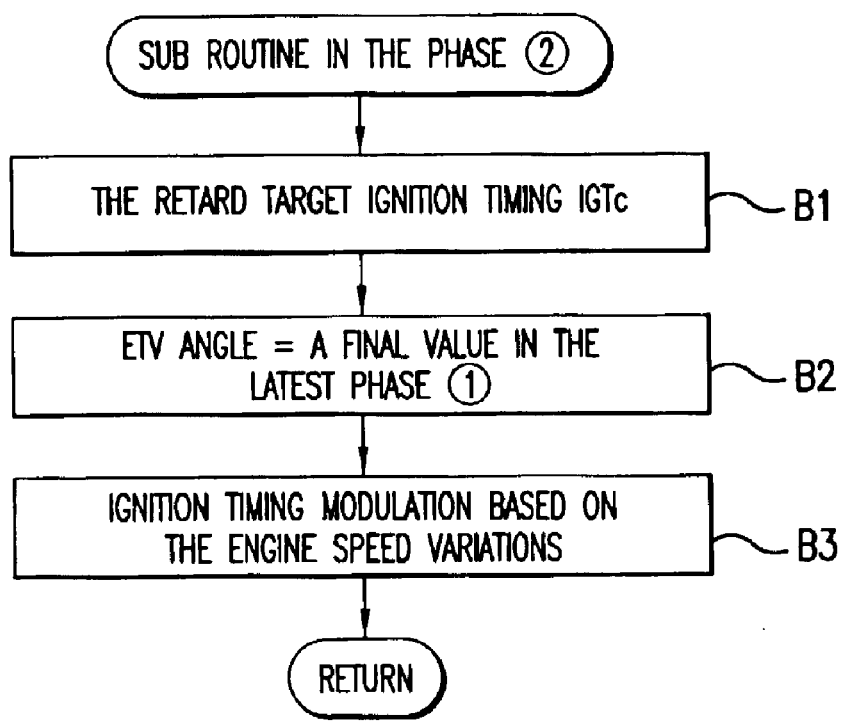
FIG. 10 is a flow chart showing a sub routine in a phase ② sub routine, which is executed by the idle speed control apparatus in FIG. 1.

As shown in FIG. 10, in Step B1 of a sub routine in phase ②, the ignition timing engine speed control m1 as the feedback control is reset, and the present ignition timing is fixed at the retard target ignition timing IGTc. Then, in Step B2, the intake air quantity engine speed control m2 as the feedback control is reset, and the angle Pobj of the ETV 13 as a final value in the latest phase ① is fixed as the present ETV angle.

In Step B3, a mean engine speed Nef is calculated according to the expression of (Ne (n−2)+Ne (n−1)+Ne (n))/3 using the last but one engine speed data, last engine speed data, and present engine speed data. Further, the newest target engine speed Neo (corresponding to the water temperature wt) is found as in Step 1. Then, the difference ΔNe between a larger one of the mean engine speed Nef and the newest target engine speed Neo and the actual engine speed Ne (n) is determined. Note that this enables control with the engine speed variations and the target engine speed Neo (corresponding to the water temperature wt) being taken into consideration. Then, an ignition modulation gain δ (set with reference to a gain map, not shown) corresponding to the deviation ΔNe thus found is set, and the retard target ignition timing IGTc is multiplied by the gain δ to perform modulation, so that the newest target ignition timing IGT (=IGTc×δ) is calculated. On this occasion, to ensure the stable revolution, the retard angle is limited to 15° CA, and the advance angle is limited to −2° CA, and the process then returns to the main routine.

In Step S11 of the main routine, it is determined whether processing in phase ② is in progress or not. If the determination result is positive (YES), the process then proceeds to Step S13, and if the determination result is negative (NO), the process then proceeds to Step s15. In Step S13, it is determined whether a predetermined period of time (here, 0.3 second) has elapsed or not. If the determination result is negative (NO), the process then proceeds to Step S12, and if the determination result is positive (YES), the process proceeds to Step S14 to provide control in phase ③.

Figure 11:
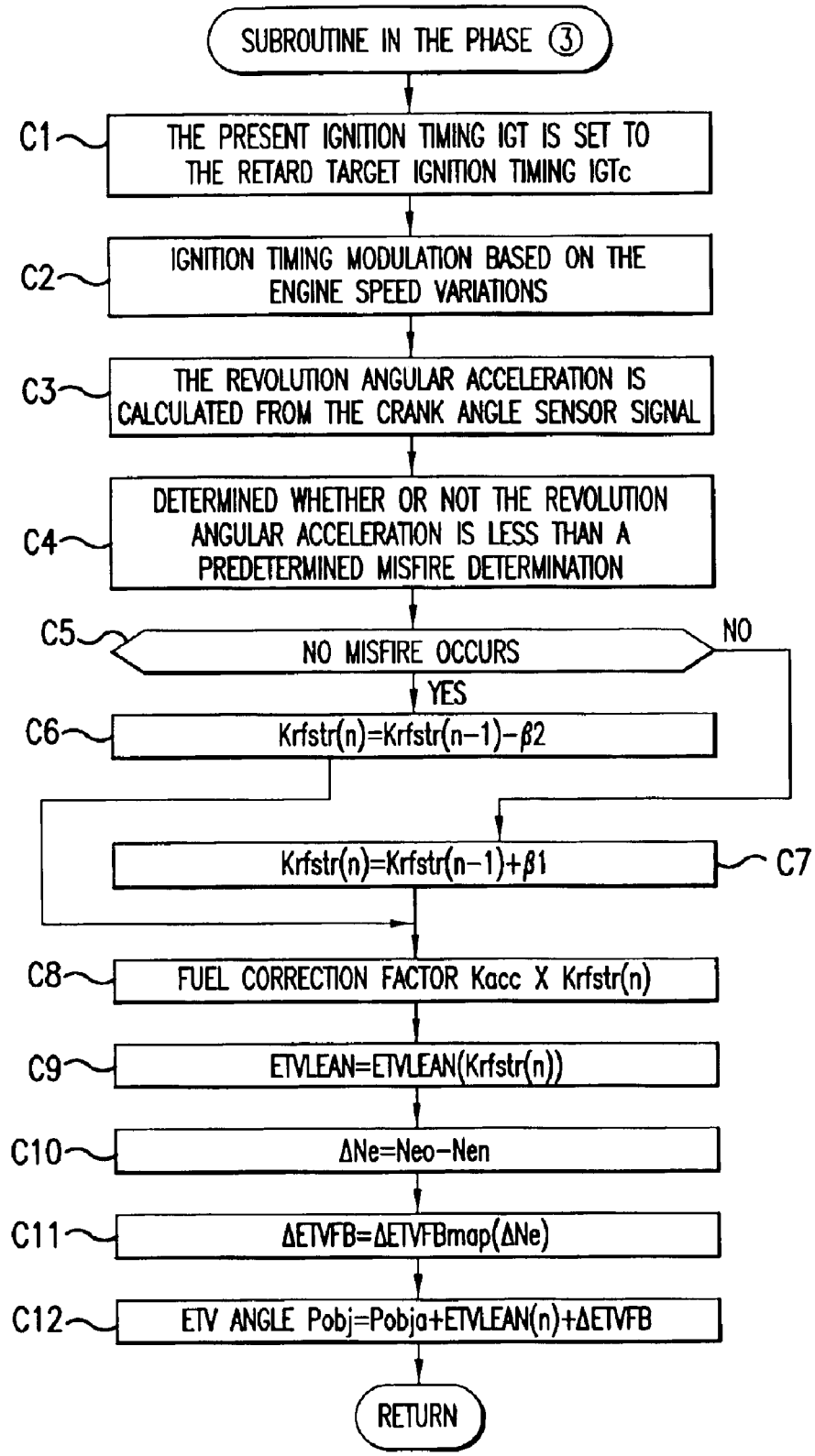
FIG. 11 is a flow chart showing sub routine in a phase ③, which is executed by the idle speed control apparatus in FIG. 1.

As shown in FIG. 11, in Step C1 of a sub routine in phase ③, the present ignition timing is set to the retard target ignition timing IGTc. Further, in Step C2, as in Step B3, the newest target ignition timing IGT (=IGTc×δ) is calculated based on the engine speed deviation ΔNe, and the ETV 13 is actuated to ignite fuel in the target ignition timing IGT.

In Step C3, the revolution angular velocity Δθc of the crank shaft 5 is determined from time series data indicative of the crank angle indicated by the crank angle signal Δθc outputted from the crank angle sensor 6, and the revolution angular velocity Δθc thus found is integrated to calculate the revolution angular acceleration θacc. It is then determined in Step C4 whether or not the revolution angular acceleration θacc is less than a predetermined misfire determination acceleration Δθc1. If it is determined in Step C5 that no misfire occurs in the present retarding process, the process then proceeds to Step C6, and if it is determined that misfire occurs in the present retarding process, the process then proceeds to Step C7 to provide lean limit control.

When the process reaches Step C7 due to the misfire, the previous value Krfstr (n−1) of the air-fuel mixture leaning factor (Krfstr) found in Step A4 is captured, and an additional value β1 for making the air-fuel mixture rich is added to the value Krfstr (n−1). Conversely, when the process reaches Step C6 due to no misfire, a subtraction value β2 for leaning the air-fuel mixture is subtracted from the previous value Krfstr (n−1) of the air-fuel mixture leaning factor (Krfstr) determined in the Step A4. In either case, the process then proceeds to Step C8.

In Step C8, the angular velocity leaning factor (Krfstr) determined in Steps C6 and C7 is multiplied by a correction factor γ for leaning the air-fuel mixture, thus calculating a fuel correction factor Kacc. The fuel injection output D (Tinj) corrected using the fuel correction factor Kacc actuates the fuel injection valve 8. Then, in Step C9, an ETV correction value ETVLEAN for leaning the air-fuel mixture is set as a value corresponding to the leaning factor (Krfstr).

In the next Step C10, the engine speed deviation ΔNe is determined by subtracting the actual engine speed Nen from the target engine speed Neo. In Step C11, an angle deviation correction value ΔETVFB for ETV 13, which is required for eliminating the engine speed deviation ΔNe, is determined. On this occasion, an increase correction value ΔETVFBmap (ΔNe) is calculated as an ETV rotation F/B correction value. The process then proceeds to Step C12.

In Step C12, the present ETV angle Pobj is calculated by adding the leaning time ETV correction amount ETVLEAN (n) determined in the Step C9 and the EVT rotation F/B correction value ΔETVFB found in Step C11 are added to the angle Pobja of the ETV 13 when phase ③ is started. The process then returns to the main routine. In Step S15 of the main routine, it is determined whether processing in phase ② is in progress or not. If the determination result is positive (YES), the process then proceeds to Step S16, and if the determination result is negative (NO), the process then proceeds to Step S18.

In Step S16, it is determined whether the conditions for switching from phase ③ to phase ④ (refer to FIG. 2) are satisfied or not. If the determination result is negative (NO), the process proceeds to Step S12 wherein the starting conditions are satisfied or not, and if the determination result is positive (YES), the process proceeds to Step S17 wherein processing in phase ④ is performed. In Step S16, to determine whether the conditions for switching to phase ④ are satisfied or not, it is determined whether or not the leaning factor (Krfstr) is equal to or greater than a target value (lean limit value: e.g., 15.5) and a predetermined period of time (0.3 second) has elapsed or not. The target value is set in such a range as to prevent an increase in the emission of NOx and to suppress the increase of HC.

Figure 12:
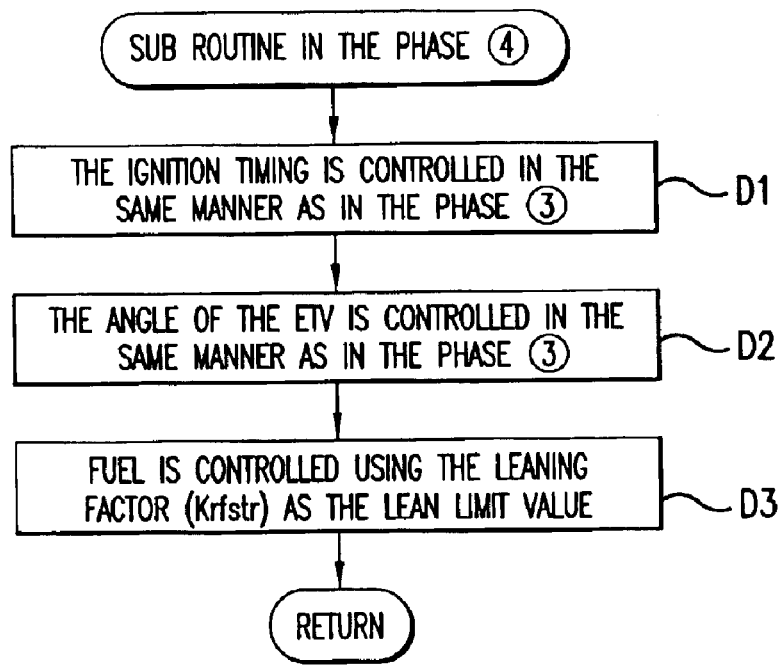
FIG. 12 is a flow chart showing sub routine in a phase ④, which is executed by the idle speed control apparatus in FIG. 1.

As shown in FIG. 12, in Step D1 of a sub routine in phase ④, the ignition timing is controlled in the same manner as in Steps C1 and C2 in phase ③. In Step D2, the angle θs of the ETV 13 is controlled in the same manner as in Step C3 and the subsequent steps in phase ③. In Step D3, fuel is controlled using the leaning factor (Krfstr) found in Steps C6 and C7 as the lean limit value (here, 0.95 (A/F: 15.5)). The process then returns to the main routine.

Figure 13:
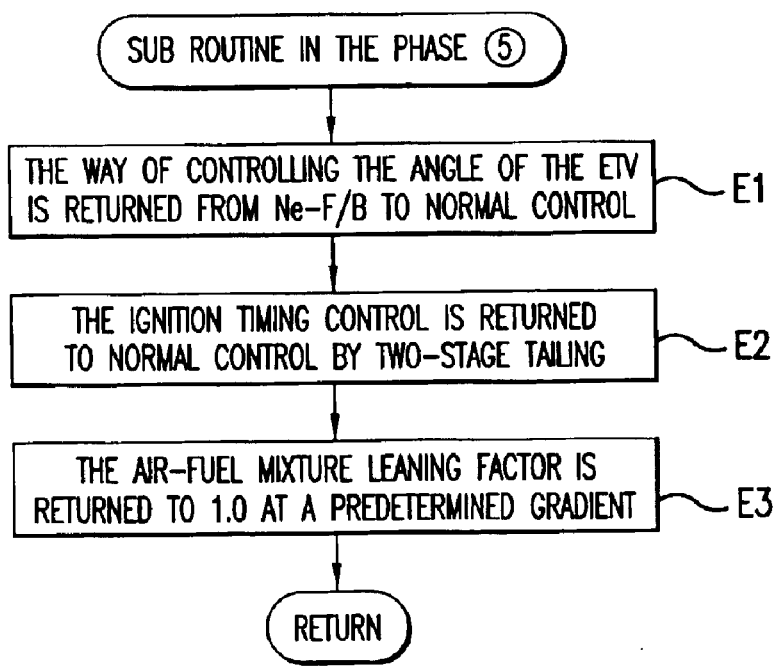
FIG. 13 is a flow chart showing sub routine in a phase ⑤, which is executed by the idle speed control apparatus in FIG. 1.
Figure 14:
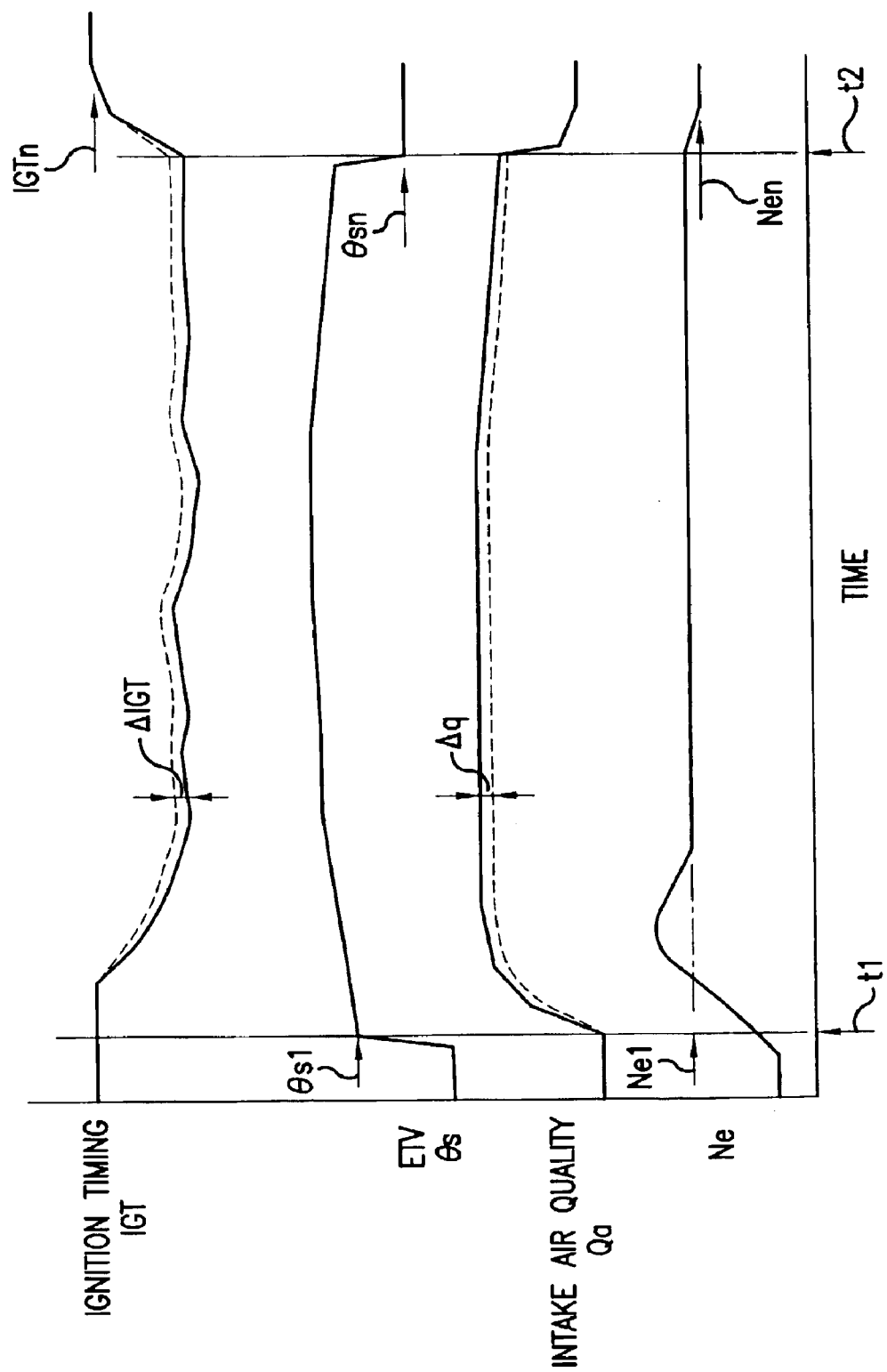
FIG. 14 is a characteristic diagram showing aging changes while a conventional idle speed control apparatus is operating.

In Step S18 of the main routine, it is determined whether processing in phase ④ is in progress or not. If the determination result is negative (NO), the process then proceeds to Step S19, and if the determination result is positive (YES), the process then proceeds to Step S12. In Step S12, if it is determined that the above described starting conditions are satisfied, the present control process is terminated, and if the starting conditions are not satisfied, the process then proceeds to Step S19 to perform processing in phase ⑤. As shown in FIG. 13, in Step E1 of a sub routine in phase ⑤, the way of controlling the angle of the ETV 13 is returned from the engine speed feedback-control to normal control.

In Step E2, the ignition timing control is returned to normal control by two-stage tailing in every stroke with the behaviors of the air quantity being simulated. In Step E3, the air-fuel mixture leaning factor is returned to 1.0 at a predetermined gradient in each control stroke. The process then returns to the main routine. In Step S20 of the main routine, it is determined whether processing in phase ⑤ has ended or not. If the determination result is negative (NO), the present control process is terminated, and if the determination result is positive (YES), the process then proceeds to Step S21. In Step S21, at a time point when the starting conditions are satisfied, the catalyst temperature increase control flag FLG1 having been turned on is reset to terminate the present control process.

As described above, the idle speed control apparatus shown in FIG. 1 first feedback-controls the engine speed to the target engine speed by retarding the ignition timing. Therefore, it is possible to promptly raise the exhaust temperature and accelerate the temperature increase of the catalytic device, and to suppress the surge of the engine speed by controlling the engine speed to the target engine speed with a high responsiveness, thus suppressing the emission of unburned fuel at the time of cold starting. Then, the engine speed is feedback-controlled to the target engine speed by controlling the intake air quantity, and thus, it is possible to stabilize the idle speed while increasing the catalyst temperature in an efficient manner by retarding the ignition timing.

Further, since the intake air quantity engine speed control m2 (Steps A11 through A15) is started after the ignition timing and the engine speed are made close to the target ignition timing IGT and the target engine speed Neo by the ignition timing engine speed control m1 (Steps A1 through A10), it is possible to switch from the ignition timing engine speed control m1 to the intake air quantity engine speed control m2 after the ignition timing and the engine speed reaches the proper values, and it is possible to stabilize the idle speed Neo during idling by controlling the intake air quantity while increasing the catalyst temperature in an efficient manner by retarding the ignition timing IGT.

Further, during the ignition timing engine speed control m1, the ignition timing IGT is retarded according to the actual engine speed Nen with respect to the target engine speed Neo, and the shortly after start angle (intake throttle angle) Pobjs is increased according to the degree of advancement ΔIGT of the actual ignition timing IGTn with respect to the cold mode target ignition timing IGTc (Steps A11 through A15), and therefore, the intake throttle angle is increased according to the expected retard angle. As a result, it is possible to compensate for an output decrease caused by the retard of the ignition timing with a high responsiveness by controlling the intake air quantity, and it is possible to retard the ignition timing in an efficient manner while maintaining the stable operating state. Further, since the ignition timing is retarded with engine speed increase caused by the air quantity increase accompanied by intake throttle angle increase, and therefore, the ignition timing can be retarded in an efficient manner.

Further, since the intake air quantity engine speed control m2 (Steps A12 through A15) is started after the ignition timing is controlled according to a variation in the engine speed so as to suppress the variation (Step A10) and then the engine speed is stabilized, it is possible to start the intake air in a stable condition and to stabilize the idle speed Neo during idling by controlling the intake air quantity while increasing the catalyst temperature in an efficient manner by retarding the ignition timing IGT.

Further, since the intake air engine speed control m2 (Steps A10 through A12) is started after the ignition timing engine speed control m1 while leaning the air-fuel mixture (Steps C2 through C7), it is possible to efficiently restrain the emission of HC while increasing the catalyst temperature in an efficient manner by retarding the ignition timing IGT.

Further, since it is possible to shift to the intake air quantity engine speed control m2 while leaning the air-fuel mixture within such a range that the revolution angular velocity Δθc lies in an allowable range, it is possible to efficiently restrain the emission of HC while increase the catalyst temperature in an efficient manner by retarding the ignition timing.

During the intake air quantity engine speed control m2, in the case where the ignition timing IGT is controlled according to the variation ΔNe in the engine speed Ne so as to suppress the variation (Steps A5 through A10), the ignition timing IGT is controlled according to the variation ΔNe in the engine speed Ne in addition to the intake air quantity engine speed control m2. Therefore, it is possible to stabilize the idle speed Ne in an efficient manner by controlling the intake air quantity and the ignition timing. Further, since there is no necessity of greatly varying the ignition timing IGT, it is possible to increase the catalyst temperature in an efficient manner by retarding the ignition timing IGT.

It should be understood that the present invention is not limited to the embodiment disclosed, but various variations of the above described embodiment may be possible without departing from the spirits of the present invention.

What is claimed is:

1. An idle speed control apparatus for an internal combustion engine including an exhaust system equipped with a catalytic device, comprising:

an ignition timing control device for retarding an ignition timing of the internal combustion engine when the internal combustion ending is started in a cold mode, such that an actual engine speed of the internal combustion engine is feedback controlled to match a target engine speed; and an intake air quantity control device for controlling an intake air quantity of the internal combustion engine to compensate for an engine speed decrease caused by the retarded ignition timing, such that the actual engine speed matches the target engine speed.

2. An idle speed control apparatus for an internal combustion engine according to claim 1, wherein said intake air quantity control device operates after said ignition timing control device causes a difference between cold mode target ignition timing and actual ignition timing to become equal to or less than a predetermined value and causes a difference between the target engine speed and the actual engine speed to become equal to or lower than a predetermined engine speed.

3. An idle speed control apparatus for an internal combustion engine according to claim 1, wherein said ignition timing control device retards the ignition timing according to the actual engine speed with respect to the target engine speed to control the engine speed.

4. An idle speed control apparatus for an internal combustion engine according to claim 1, wherein said intake air quantity control device operates when said ignition timing control device is controlling the engine speed, for increasing an intake throttle angle according to a degree of advancement of actual ignition timing with respect to cold mode target ignition timing.

5. An idle speed control apparatus for an internal combustion engine according to claim 1, wherein said ignition timing control device feedback-controls the engine speed of the internal combustion engine to the target engine speed while gradually retarding the ignition timing, and said intake air quantity control device operates when said ignition timing control device is controlling the engine speed, for gradually increasing an intake throttle angle.

6. An idle speed control apparatus for an internal combustion engine according to claim 1, wherein said ignition timing control device operates after the engine speed is controlled by controlling the ignition timing, for controlling the ignition timing according to a variation in the engine speed to suppress the variation, and said intake air quantity control device then controls the engine speed by controlling the intake air quantity.

7. An idle speed control apparatus for an internal combustion engine according to claim 1, further comprising:

an air-fuel ratio adjusting device that operates when said intake air quantity control device is controlling the engine speed, for changing an air-fuel ratio of the internal combustion engine to a lean air-fuel ratio.

8. An idle speed control apparatus for an internal combustion engine according to claim 7, wherein said air-fuel ratio adjusting device operates when said intake air quantity control device is controlling the engine speed, for changing the air-fuel ratio of the internal combustion engine to a lean air-fuel ratio in such a range that a revolution angular speed lies in an allowable range.

9. An idle speed control apparatus for an internal combustion engine according to claim 1, wherein said ignition timing control device operates when said intake air quantity control device is controlling the engine speed, for controlling the ignition timing according to a variation in the engine speed so as to suppress the variation.

10. An idle speed control method for an internal combustion engine including an exhaust system equipped with a catalytic device, comprising:

providing control to retard ignition timing of the internal combustion engine to feedback control an actual engine speed of the internal combustion engine such that the actual engine speed matches a target engine speed when the internal combustion engine is started in a cold mode; and controlling an intake air quantity of the internal combustion engine, after the providing step, to compensate for an engine speed decrease caused by the retarded ignition timing, to feedback-control the actual engine speed of the internal combustion engine, such that the actual engine speed matches the target engine speed.

11. An idle speed control method for an internal combustion engine according to claim 10, wherein said controlling step includes executing the controlling step after said providing step causes a difference between cold mode target ignition timing and actual ignition timing to become equal to or less than a predetermined value and causes a difference between the target engine speed and an actual engine speed to become equal to or lower than a predetermined engine speed.

12. An idle speed control method for an internal combustion engine according to claim 10, wherein said providing step includes retarding the ignition timing according to the actual engine speed with respect to the target engine speed to control the engine speed.

13. An idle speed control method for an internal combustion engine according to claim 10, wherein said providing step includes increasing an intake throttle angle according to a degree of advancement of actual ignition timing with respect to cold mode target ignition timing.

14. An idle speed control method for an internal combustion engine according to claim 10, wherein said providing step includes feedback-controlling the actual engine speed to the target engine speed and gradually increasing an intake throttle angle while gradually retarding the ignition timing.

15. An idle speed control method for an internal combustion engine according to claim 10, further comprising:

transitionally controlling the ignition timing according to a variation in the engine speed to suppress the variation;

wherein said controlling step is executed after said transitionally controlling step.

16. An idle speed control method for an internal combustion engine according to claim 10, wherein said controlling step includes changing an air-fuel ratio of the internal combustion engine to a lean air-fuel ratio.

17. An idle speed control method for an internal combustion engine according to claim 16, wherein said controlling step includes changing the air-fuel ratio of the internal combustion engine to a lean air-fuel ratio in such a range that a revolution angular speed lies within an allowable range.

18. An idle speed control method for an internal combustion engine according to claim 10, wherein said controlling step includes controling the ignition timing according to a variation in the engine speed to suppress the variation.

* * * * *